United States Patent [19]
Hardt et al.

[11] Patent Number: 5,544,195
[45] Date of Patent: Aug. 6, 1996

[54] HIGH-BANDWIDTH CONTINUOUS-FLOW ARC FURNACE

[75] Inventors: David E. Hardt, Concord, Mass.; Steven G. Lee, Ann Arbor, Mich.

[73] Assignee: Massachusetts Institute of Technology, Cambridge, Mass.

[21] Appl. No.: 359,158

[22] Filed: Dec. 19, 1994

[51] Int. Cl.$^6$ .................................................. F27D 3/00
[52] U.S. Cl. .............................. 373/79; 373/72; 373/115
[58] Field of Search ................................. 373/10, 13, 14, 373/18, 20, 22, 63, 62, 65, 72, 110, 79, 71, 83, 115

[56] References Cited

U.S. PATENT DOCUMENTS

| | | | |
|---|---|---|---|
| 1,556,377 | 10/1925 | Tingley | 373/63 |
| 1,837,070 | 12/1931 | Roth . | |
| 2,207,746 | 7/1940 | Maier | 373/18 |
| 4,079,185 | 3/1978 | Collin | 13/33 |
| 4,510,609 | 4/1985 | Caslavsky et al. | 373/110 |
| 4,541,099 | 9/1985 | Rappinger et al. | 373/72 |
| 4,654,858 | 3/1987 | Rowe | 373/22 |
| 4,775,982 | 10/1988 | Bodenhamer | 373/72 |
| 5,132,984 | 7/1992 | Simpson | 373/18 |
| 5,173,920 | 12/1992 | Bochsler et al. | 373/72 |
| 5,408,494 | 4/1995 | Schlienger | 373/20 |

FOREIGN PATENT DOCUMENTS 2142858  1/1985  United Kingdom .

OTHER PUBLICATIONS

Mathur, P., et al., "Analysis of the Spray Deposition Process," *Acta Metall.* 37(20: 429–443 (1989).

Itsukaichi, T., et al., "Joining of Aluminum Matrix Composites by Plasma Spraying," *New Advances in Welding and Allied Processes, Proceedings of the International Conference*, vol. II, May 8–10, 1991, Beijing, China.

Passow, C. H., "A Study of Spray Forming Using Uniform Droplet Sprays," master's thesis, Massachusetts Institute of Technology, pp. 27–37, Jun. (1992).

*Primary Examiner*—Tu Hoang
*Attorney, Agent, or Firm*—Hamilton, Brook, Smith & Reynolds, P.C.

[57] ABSTRACT

A high-bandwidth continuous-flow arc furnace for stream welding applications includes a metal mass contained in a crucible having an orifice. A power source charges an electrode for generating an arc between the electrode and the mass. The arc heats the metal mass to a molten state. A pressurized gas source propels the molten metal mass through the crucible orifice in a continuous stream. As the metal is ejected, a metal feeder replenishes the molten metal bath. A control system regulates the electrode current, shielding gas pressure, and metal source to provide a continuous flow of molten metal at the crucible orifice. Independent control over the electrode current and shield gas pressure decouples the metal flow temperature and the molten metal flow rate, improving control over resultant weld characteristics.

32 Claims, 3 Drawing Sheets

HIGH-BANDWIDTH CONTINUOUS-FLOW ARC FURNACE

GOVERNMENT SUPPORT

The Government has rights in this invention pursuant to contract number DE-FG02-85ER13331 awarded by the United States Department of Energy.

BACKGROUND OF THE INVENTION

Gas Metal Arc Welding (GMAW) was introduced in the 1920's and became commercially available in the 1950's. In GMAW, an electrical arc is generated between a metal electrode and a weld pool. The electrode is consumed by the arc and is fed continuously into the arc region to replenish the weld pool with filler metal. A shielding gas, commonly argon or helium, prevents atmospheric gases from oxidizing the molten weld pool.

There are three methods for transferring metal from the electrode to the workpiece in the GMAW process: short circuit transfer, globular transfer, and spray transfer. In short circuit transfer, electrode metal is transferred when the charged electrode contacts a grounded weld pool. Short circuit transfer characteristics include small electrode diameters and low welding currents. The weld pool is usually small and is generally suited for thin weld sections.

Globular transfer is characterized by drop sizes that are larger in diameter than that of the electrode. Gravity pulls the drop from the tip of the electrode to the workpiece. This method requires slightly higher currents and voltages than short circuit transfer. However, with a shielding gas comprising carbon dioxide and helium, globular transfer is operable at a wider range of welding currents. A primary disadvantage of globular transfer is that the metal drop splatters upon impact with the workpiece and the resulting weld bead is irregular and imprecise.

In the spray transfer process, an argon-rich shielding gas provides a stable, splatter-free axial spray. Once the input current becomes higher than a transition current, the metal transfer ceases to be globular and becomes a spray transfer. Spray transfer generates very small drops at rates of hundreds per second, unlike globular transfer which generates large drops at rates of several per second.

GMAW weld characteristics include: weld bead geometry, characterized by bead width, penetration depth, and reinforcement height; thermally-induced stress and strain effects; weld seam microstructure; and weld bead location relative to the seam. The characteristics listed above result from several input factors: weld current, arc voltage, travel speed, electrode extension, polarity, shielding gas composition, and shielding gas flow rate.

There has been investigation in the development of models and implementation of control strategies for refining and optimizing the GMAW process. Much of the research has been conducted on welding parameters and bead geometry. Inputs such as the settings on the weld machine (weld current, arc voltage) determine the weld joint characteristics. Handbook values are often used for determining these inputs in an open-loop control operation. Open loop control is vulnerable to many disturbances such as geometry variances, material properties, thermal boundary conditions and arc process changes. These disturbances contribute to poor control over resultant weld joint characteristics.

Closed-loop control using the final weld joint characteristics as feedback typically involves a large transportation lag. The lag is due to the unavailability of equipment for measuring bead penetration or for measuring thermally-induced stress and strain effects or material microstructure in a quick and efficient manner. Video cameras have been used to provide feedback of the joint characteristics, but this method is neither cost effective nor efficient.

In the GMAW process, the total heat input to the workpiece is a function of the electrical energy of the arc and the heat energy of the superheated spray of small metal droplets from the consumable electrode. The efficiency of the arc and the temperature of the droplets are generally unknown, which complicates control of the heat input. The heat input is also a function of the wire feed rate. To obtain an increase in heat input per unit length for a constant arc voltage, either the wire feed rate is increased to elevate the current, or the travel speed is decreased.

Recent advances in thermal spraying allow for the generation of uniform sized droplets having a controllable temperature and mass flow rate. Thermal spraying, otherwise known as "metallizing" "metal spraying" or "flame spraying" is a process in which finely divided metallic or non-metallic materials are deposited on the workpiece or substrate in a molten or semi-molten condition. Deposit materials include wire, rod, cord, and powder. The material is heated either by oxyfuel gas flame, electric arc, plasma, or detonation of an explosive gas mixture. The molten material is propelled from a spray gun to the substrate in a gas stream. As the molten particles strike the substrate, they flatten and form thin platelets that conform to the irregularities of the substrate geometry. Because the particles are small, they have a high surface-area-to-volume ratio, which allows for rapid cooling. The particle droplets build on top of one another successively until the desired structure is formed. The bond between the droplets and the substrate can be mechanical, metallurgical, chemical, or a combination of these. A post-heating treatment is commonly used to increase the bond strength by diffusion or by chemical reaction between the deposited droplets and the substrate.

There are several processes for generating the heat necessary for the thermal spray process. The first group of processes uses combustible gas: subsonic flame spraying and hypersonic flame spraying. The second group uses electrical power: arc spraying, plasma spaying, induction coupled plasma spraying, and the Osprey process.

Subsonic flame spraying operates by feeding the spray material into an oxyfuel gas flame. The particles are melted by the flame and propelled onto the workpiece by the force of the flame. Spray materials are limited to those which will not burn or become severely oxidized by the flame.

Hypersonic flame spraying operates in either a detonation or in a continuous process. In the detonation process, spray material is heated by rapid successive detonations of an explosive mixture of oxygen and acetylene. The continuous process requires a propylene-oxygen mixture or ethylene, hydrogen, and propane. Particles exit at velocities in excess of Mach 4. The kinetic energy associated with the speed of the spray particles is released in the form of heat by impingement upon the substrate, promoting bonding, high deposit density, and appreciable hardness values.

Arc spraying generates heat with electrical energy. Two continuously-fed wires are melted by an arc generated between them. The molten metal is atomized and propelled onto a substrate by a high-velocity gas jet. Electrode deposit materials are limited to those available in wire form, or powders contained in a metal sheath.

Plasma spraying operates by maintaining an arc between a Tungsten cathode and a constricting nozzle which serves as an anode. An inert gas is forced through the arc under pressure, which ionizes the gas. The hot plasma gas then exits through the nozzle as a high-velocity jet. Deposit material, in powder form, is fed into the hot plasma stream where it melts and is propelled onto the substrate.

Induction-coupled plasma Spraying creates an ultra-high-temperature arc region measuring approximately two inches in diameter by six inches long. A deposit material in the form of powder is injected into this region and is pressurized and ejected at high velocity. This process is similar to plasma spraying but uses a larger heating area for the powder, creating larger particles.

In the Osprey process, an induction furnace melts an alloyed charge in a crucible on top of a spray chamber to a uniform temperature. The crucible is pressurized by nitrogen gas to force the molten metal through a refractory nozzle in the bottom of the crucible. The molten metal stream is broken up into small droplets in an atomizing zone below the crucible by the pressurized nitrogen gas which further accelerates the droplets onto the substrate.

The shortcomings of these aforementioned processes include poor adhesion between the deposit and substrate, deposit splatter, poor control over droplet location, porosity, and unknown droplet energy state. Poor bond strength or adhesion is influenced by many of the same factors as arc welding: coating material, spray particle size, substrate condition and geometry, degree of surface roughness, surface cleanliness, surface temperature, particle impact velocity, type of base material, and spray angle. High spray velocities are required for most of these processes. This cools the droplets quickly, compromising fusion between the droplets and the substrate and causing problems with splatter and droplet placement. Porosity results from the deposition of droplets of random sizes. The smaller droplets often solidify before impact on the substrate. Several layers of these droplets in a solid state may cause flow restrictions which contribute to gas entrapments on the substrate and therefore porosity. Even if uniform powders are used in thermal spraying, temperature uniformity among the droplets is not guaranteed.

The primary disadvantage with each aforementioned thermal spray process is the unknown energy states of the droplets. The size and temperature of each droplet determines its energy content. Even if metal droplets are initially the same temperature as in the Osprey process, the energy content is vastly different if the droplets are not the same size. The rapid heating also makes it difficult for the droplets to reach temperature equilibrium, since a slight time difference for passage through the heating area will affect their respective temperatures.

Thermal spraying applications include spray coating of a substrate, spray forming, and creation of metal matrix composites. Recent research has focused mainly on spray forming and metal matrix composites wherein the control of the enthalpy of the droplets in the impinging spray is critical. Spray forming permits the production of high density bulk metal shapes having a relatively uniform and fine grain size throughout. A number of different shapes can be deposited by maneuvering the substrate beneath the spray. For example, deposition onto a large diameter drum or wheel allows strip or sheet to be produced. A mass flow rate in excess of 0.3 kg/s allows for rapid production of large products. Metal matrix composites combine ceramic reinforcement materials with metal to form a matrix, combining the advantageous properties of both ceramic and metal including strength, stiffness, creep resistance, fracture toughness and thermal expansion.

A recent advancement in thermal spraying involves an apparatus which produces uniform metal drops. Resistive heating elements melt metal contained in a crucible. Inert gas pressure is applied over the molten metal to eject a fine stream out an orifice at the bottom of the crucible. The fine stream is broken up into uniform droplets by a piezoelectric element. A charging plate imparts a small charge onto each droplet to avoid collisions between droplets. This new process is able to accomplish what the traditional Osprey process could not by using a precisely controlled piezoelectric device instead of a gas flow to break up the stream.

Spray welding was invented by Singer, A. R. E. as described in U.K. Patent Application GB2142858A. The process comprises locally heating the area of the weld joint above its solidus temperature and applying filler metal in a non-oxidizing atmosphere onto the heated surface. The filler metal is in the form of a spray of molten particles. The applied filler metal is preferably shot-peened for consolidation.

Itsukaichi, et al. used a plasma spray and silicon carbide (SIC) to create a metal matrix composite weld joint on both aluminum alloy and aluminum alloy matrix composite substrates. As described in "Joining of Aluminum Matrix Composites by Plasma Spraying", *Proceedings of the International Conference in Beijing,* China, Pergamon-CNPIEC (1991). This process of using a plasma spray to weld is in essence spray welding. Accordingly, it suffers from the limitations of spray welding explained above such as poor control over droplet placement, unknown energy state of the droplets, splatter, poor bond strength and porosity. To alleviate the strength problem, the weld joints are treated by processes such as Hot Isostatic Pressure Consolidation and solution/aging heat treatment.

SUMMARY OF THE INVENTION

The present invention is directed to an apparatus and method for a high-bandwidth continuous flow arc furnace for stream welding and stream forming applications. The apparatus of the invention comprises a metal mass contained in a crucible. An electrode is positioned proximal to the metal mass. A power source induces current in the electrode and an arc forms between the electrode and the metal mass. The arc heats the metal mass to a molten state. A pressurized gas source propels the molten metal mass through an orifice in the crucible. A metal feeder replenishes the metal mass as it is released through the orifice. A control system regulates the electrode current, shielding gas pressure, and metal feeder rate such that a continuous flow of molten metal is provided at the crucible orifice.

In a preferred embodiment, the flow rate of the molten metal is independent of the temperature of the molten metal. The electrode current is used to independently control the molten metal temperature. The temperature is measured by a heat sensor or pyrometer. The temperature at a workpiece receiving the molten stream may be measured for providing additional feedback for controlling electrode current. The pressurized gas source independently controls the molten metal flow rate. The arc voltage is held constant by maintaining a constant molten metal pool height with the metal feeder. Decoupling of the molten metal flow rate from the molten metal flow temperature increases the predictability of the resultant weld characteristics.

Radiation shields contain the arc energy in the form of heat in the crucible region of the furnace. The crucible is comprised of graphite, while the insulation material is comprised of aluminum oxide. A shielding gas source comprising inert gas bathes the molten metal to prevent reaction between the molten metal and atmospheric gases. The control system comprises a computer. The metal mass material is selected from the group consisting of tin, aluminum, copper, steel and alloys.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The novel stream welding process of the present invention produces a controlled molten metal stream rather than a spray of droplets. The stream is deposited directly onto the workpiece and supplies both the heat required to create the metallurgical bond and also supplies the filler metal for reinforcement strength.

Stream welding simplifies and improves the controllability of prior art welding processes such as GMAW. As described above, in GMAW the energy transferred to the workpiece is in two forms: electrical energy from the arc, and thermal energy contained in the droplet. The dual source of energy complicates control over the process. In the stream welding process of the present invention, heat is supplied to the workpiece in the form of thermal energy from the metal stream alone, eliminating the contribution of heat from the arc energy, allowing for increased control over energy input.

In the stream welding process and apparatus of the present invention, molten metal contained by a crucible is heated in a miniature furnace to a desired temperature. A difference in pressure is provided across an orifice at the bottom of the crucible to eject the molten metal in a continuous stream of metal toward the workpiece or base plate. The temperature of the molten metal stream is independent of the pressure applied to eject the molten metal. Thus, stream welding decouples the heat input and mass flow rate by separately controlling the temperature of the metal and the velocity of the stream. The stream ejected from the crucible is not divided into droplets.

Figure 1:
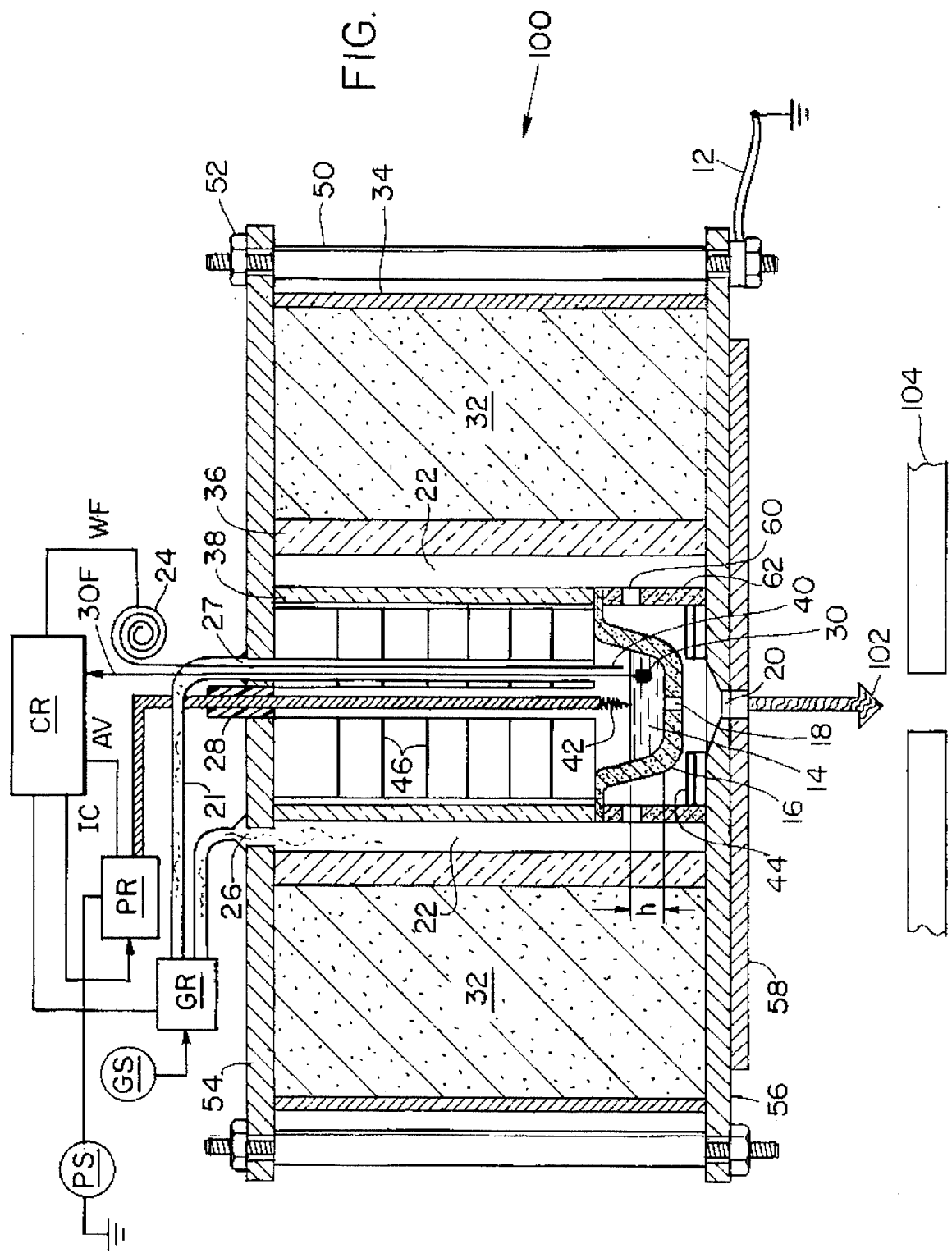
FIG. 1 is a schematic sectional side view of a preferred embodiment of a high-bandwidth continuous-flow arc furnace in accordance with the present invention.

FIG. 1 is a sectional side view of a preferred embodiment of a high-bandwidth continuous-flow arc furnace in accordance with the present invention. The preferred embodiment includes a non-consumable, centrally-located single electrode 10 formed of 2% thoriated tungsten. The electrode 10 is positioned above a charge mass 14 of weld material, for example aluminum, contained in a crucible 16 formed of graphite. The crucible 16 is supported by a support ring 62 comprised of graphite, which is seated above a lower flange 56 of stainless steel. The lower flange 56 is electrically-grounded by a ground wire 12. The lower flange 56 and support ring 62 provide an electrically conductive path to ground 12 for the crucible 16. Current for forming an arc 42 between the electrode 10 and the charge mass 14 flows from a power supply PS through power regulator PR, electrode 10, across arc 42 to the charge mass 14, through the crucible 16, crucible ring 62, and lower flange 56 to ground 12. The arc 42 is initiated by a high-frequency arc starter located in the power supply PS. The arc starter is essentially a charged capacitor that discharges a rapid high-voltage charge to initiate the arc. The ground wire 12 and the power supply PS are connected to a common ground, To prevent the electrode 10 from short-circuiting with the upper flange 54, an electrode insulator 28 is disposed coaxially around the electrode 10.

The furnace is supported by an upper flat circular flange 54 and a lower flat circular flange 56 of stainless steel. The flanges are held together by a plurality of threaded rods 50 and nuts 52. Upper radiation shields 46 and lower radiation shields 44 formed of graphite are disposed concentric to the electrode directly above and below the crucible 16 for containing heat within the crucible area. Coaxially surrounding the upper radiation shields 46 is a first densified ceramic cylinder 38. The first cylinder 38 is supported by the crucible 16 and the crucible support ring 62. Surrounding the densified ceramic cylinder 38 is a shielding gas chamber 22 for directing inert shielding gas GS to the furnace area through a shielding gas port 60 opening in the support ring 62. An opening in the upper flange 54 provides a shielding gas inlet port 26. Coaxially surrounding the shielding gas chamber 22 is a second optional densified ceramic cylinder 36. Coaxially surrounding the optional second cylinder 36 is a high temperature insulation layer 32 comprised of aluminum oxide contained by a cylinder 34 preferably comprising stainless steel. A cooling coil 58 preferably comprised of copper, is disposed adjacent the lower flange 56 as a heat sink for cooling the flange 56.

In operation, the charge mass 14 is heated to a desired temperature by the energy transmitted by the arc 42. The bandwidth of the system is defined as the rate of change in temperature of the mass per unit time. For optimal bandwidth, a small charge mass 14 is preferred. Less energy and time is required to change the temperature of a smaller mass. Therefore, a small crucible 16 is preferred for containing the mass 14. Inert gas pressure is sourced at a gas source GS, regulated by a gas regulator GR, and coupled by pressure tube 21 through a port 27 into the arc region above the charge mass 14. Once the molten charge mass 14 reaches the desired temperature, it is forced by the gas pressure through the orifice 18 in the bottom of the crucible 16 and ejected as a molten stream 102 through the lower flange outlet 20. The crucible 20 may contain several orifices 18 depending on the application.

The flow rate of the molten metal 102 is adjusted by varying the gas pressure applied to the crucible 16 by the gas source GS as controlled by the gas pressure regulator GR. The difference between the furnace pressure and atmospheric pressure at the workpiece 104 determines the flow rate and outlet velocity of the molten metal stream in a closed-loop control system. The flow rate of the stream 102 is decoupled from the stream temperature as described above.

A closed-loop control system driven by a computer CR maintains a constant height h of the molten charge mass pool 14. As metal is ejected out of the orifice 20, the charge mass 14 is continuously replenished by filler wire 40 fed into the charge mass 14 by a wire feed machine 24. A constant weld pool height h is preferred for maintaining a constant arc voltage. The arc voltage is proportional to the arc length which is the distance between the electrode tip 10 and the top of the charge mass 14. The arc voltage AV is measured with a voltage sensor and fed back into a computer CR. The computer CR maintains temperature control of the arc furnace by monitoring the temperature of the charge mass 14 using a thermocouple 30 embedded in the crucible region. Alternatively, temperature of the charge mass 14 may be sampled by using other means, for example, pyrometers. The computer CR controls input current to the arc furnace with a power regulator PR. The input current multiplied by the arc voltage is equivalent to the energy per unit time or power supplied to the furnace. Since the arc voltage is maintained at a constant preset value, a change in input current corresponds directly to a change in power. A variation in power applied to the small charge mass 14 allows for a rapid adjustment of the temperature of the charge mass 14, providing high temperature bandwidth.

As explained above, arc voltage is a function of arc length. Input power can be calculated if the current input is known and if the arc voltage is measured:

$$P=EI$$

where:
P is the total input power of the heat source in Watts
E is the voltage drop across the arc
I is the current measured across the arc.

Arc voltage is constant if the electrode is maintained at a constant specific distance from the top of the molten pool 14. As metal flows through the crucible orifice 18, the height h of the molten pool starts to decrease and the distance from the molten pool 14 to the electrode 10 will therefore tend to increase, causing the arc voltage to increase. However, the arc voltage AV is continuously monitored by the computer CR which provides a signal WF to a wire feed machine 24 to feed more filler metal 40 into the arc furnace when the arc voltage starts to increase. Thus, arc voltage AV is used as a feedback variable to control the height of the molten pool 14. With the arc voltage being maintained at a constant value, the input power is modulated by simply varying the current input. Additional electrodes may be added for further distributing the arc energy.

Input current controls the temperature of the molten metal stream. In turn, the temperature of the charge mass is monitored to provide feedback for adjusting the input current. An ideal feedback temperature measurement is the temperature of the molten stream 102 just before impact on the substrate 104, but such a measurement would not be cost effective. An acceptable alternative is a measurement of the average temperature of the molten bath 104 in the crucible 16. A shielded high-temperature thermocouple 40 senses the temperature of the bath. The computer CR responds by adjusting the input current to an appropriate level.

The power source is preferably one which falls within the range of normal welding power usages. An ideal source uses direct current as an input, and has a voltage adjustment which is decoupled from the current input and is easily adjusted by the user. Such power supplies are commonly used in Gas Tungsten Arc Welding (GTAW).

A preferred embodiment of the arc furnace has a working temperature of about 2,200° C. It follows that furnace components which are proximal to the molten metal must be made from high temperature refractories. Characteristics to consider include thermal conductivity, hot strength, thermal shock, and chemical resistance.

Thermal conductivity is referred to as a transport property, providing an indication of the rate at which energy is transferred by the diffusion process. In order to build an efficient furnace, unnecessary heat loss must be kept to a minimum. Therefore, thermal insulation comprising low thermal conductivity materials are used to limit heat loss.

Hot strength represents the ability of a material to remain intact while under load at elevated temperatures. The mass flow rate of the molten stream is controlled by varying the inert gas pressure within the crucible above the molten metal mass 14. In order to sustain a reasonable gas pressure gradient within the furnace, the material must have low porosity to preclude the gas from escaping and must have high hot strength to maintain the pressure seal.

Arc heating involves rapid changes in temperature. Rapid heating causes steep thermal gradients to develop which may cause materials to crack. Tensile strength, thermal conductivity, modulus of elasticity and thermal expansion are the characteristics that determine how well a material resists thermal shock. Preferred thermal shock resistant non-metallic materials include graphite, silicon carbide, mullite, and stabilized zirconia.

Destructive chemical reactions are the most common cause for failure of a material at high temperature. Many materials at high temperature will oxidize or decompose if exposed to air. Most non-metallic oxide and fire clay materials are inert to oxidation. Oxidation is caused by carbon monoxide, carbon dioxide, water, or oxygen. Carbon and graphite are very susceptible to oxidation at elevated temperatures in the presence of oxidizing agents. Coating the graphite with alumina, silicon carbide and zirconia increases the oxidation resistance of graphite. Problems due to oxidation can be relieved by surrounded the high temperature materials with inert gas.

The material used for electrical ground in the arc furnace is preferably conductive. In view of this, graphite is the preferred crucible 16 material. Graphite offers excellent thermal shock resistance, low resistivity, chemical resistance, and high maximum temperature in an oxygen-free environment. Being proximal to the electrode 10 and charge mass 14, the crucible 16 will experience the quickest change in temperature. The low resistivity of a graphite crucible will provide a conductor for the electrical path needed for the arc furnace. The chemical resistance prevents the molten metal from forming other compounds.

For structural support and electrical and thermal insulation, aluminum oxide is preferred. It offers high electrical resistivity, good thermal shock resistance, excellent oxidation resistance at high temperatures and very good hot strength. An alternative insulation material is mullite which is a combination of three parts aluminum oxide and two parts silica.

The preferred embodiment includes graphite radiation shields above 46 and below 44 the crucible 16. The radiation shields offer several advantages over aluminum oxide insulation. First, the shields minimize heat loss from the furnace area. Additionally, aluminum oxide has a strong tendency to flake and if the flakes mix with the molten metal, the flakes may clog the small orifice at the bottom of the crucible 16.

The outer densified ceramic cylinder 36 provides an extra layer of thermal protection for the high temperature insulation 32. The cylinder 36 may be removed or its inner radius reduced to provide a greater cross-sectional area for inert gas to flow from the upper flange 54 through the gas ports 60. The molten metal flow is bathed with inert gas to prevent atmospheric gases from reacting with the flow.

Figure 2:
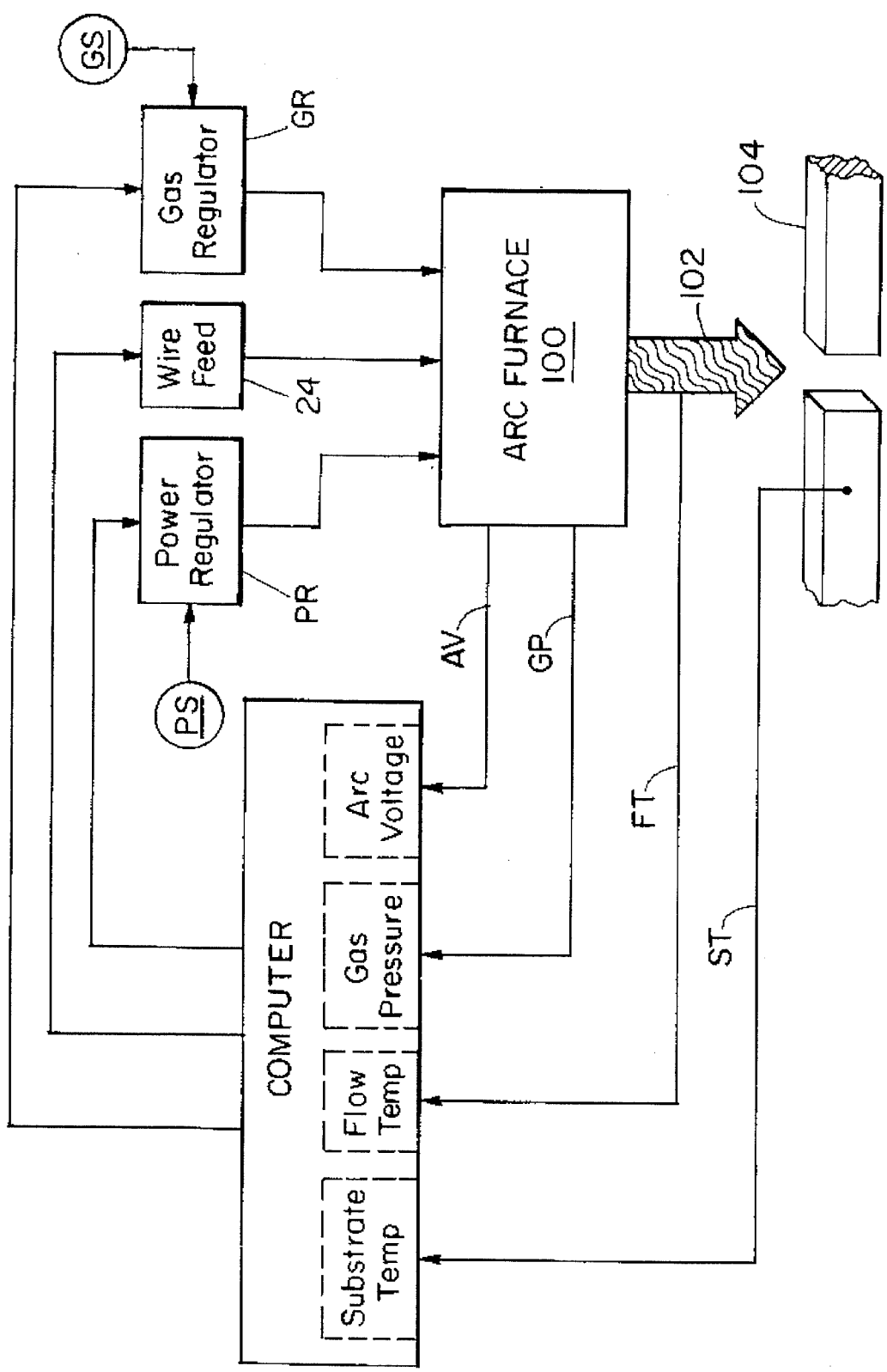
FIG. 2 is a block diagram of a control system for the embodiment of FIG. 1.

FIG. 2 is a block diagram of a preferred control system for the embodiment of FIG. 1. The arc voltage AV, the mass flow temperature FT and the gas pressure GP are continuously monitored by a computer CR. The computer CR reacts to this information by transmitting signals to a power regulator PR, a wire feed machine 24, and a gas regulator GR. The power regulator PR controls the input current to the electrode in the arc furnace 100. The current is sourced by a power source PS. Additional current creates a stronger arc, which increases the temperature of the molten bath. Reducing the current allows the bath to cool. The wire feed machine 24 controls the introduction of filler wire into the charge mass in the arc furnace 100 as a function of arc voltage. By maintaining the molten pool at a constant height, the arc voltage AV remains constant, and input power is solely a function of input current. The gas regulator GR controls the gas pressure above the metal pool sourced by a gas source GS. The computer CR monitors gas pressure GP above the pool as an indication of output metal flow rate and signals the gas regulator GR to adjust gas pressure accordingly.

The initial heat input rate is a function of the mass flow rate, which in turn is a function of the diameter and velocity of the molten metal stream 102. The initial heat input is also correlated to temperature variation in the workpiece or substrate 104. As the substrate temperature ST rises, the heat imparted by the molten stream 102 to the substrate 104 decreases. This is due to the decrease in the difference in energy state between the substrate 104 and the stream as the temperature of the substrate approaches the temperature of the stream. Thus, by monitoring the substrate temperature ST continuously, the necessary information for calculating the heat imparted by the stream is provided and the temperature FT of the metal flow can be adjusted accordingly.

To minimize heat loss in the stream 102 and to prevent random disturbances from breaking up the stream, the length of the stream 102 should be as short as possible. The stream length is the distance from the crucible orifice 20 to the substrate 104. The molten metal stream 102 is preferably substantially superheated, continuously flowing, has a mass flow rate independent of mass temperature and has high thermal bandwidth. The molten metal stream 102 should be substantially continuous because many welding applications require joining of long sections. Also, a continuous stream 102 has a lower surface area to volume ratio than droplets and thus, a continuous stream loses less heat than prior art spray techniques. The mass flow rate should be decoupled from the mass temperature in order to provide greater control of heat input to the substrate. The molten metal 102 is preferably substantially superheated for providing adequate heat to metallurgically bond the deposit and the substrate. The ability to change the stream 102 temperature quickly or to have high thermal bandwidth increases the controllability and flexibility of the system.

Figure 3:
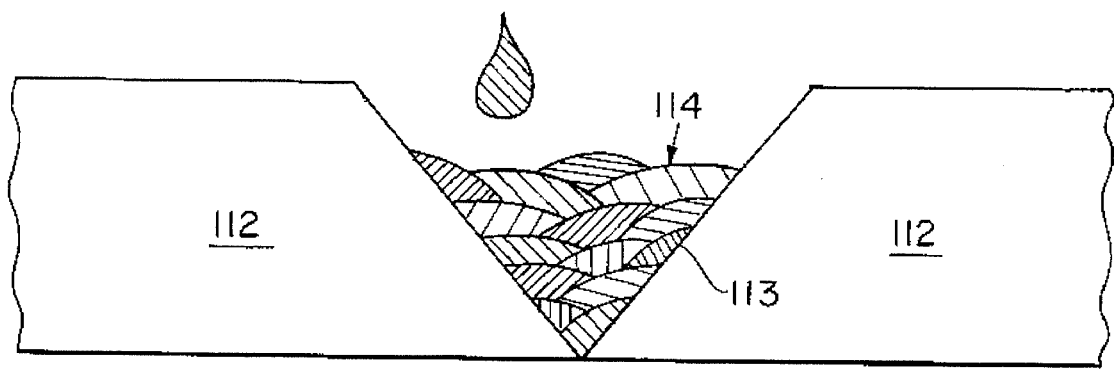
FIG. 3 is a sectional side view of a prior art deep welding technique.
Figure 4:
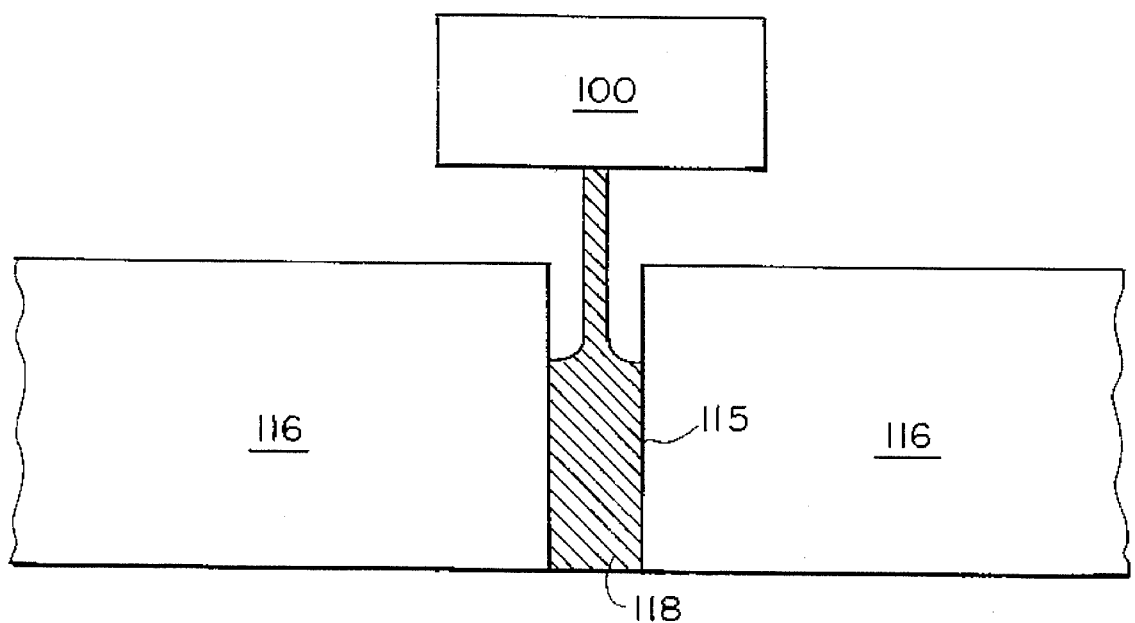
FIG. 4 is a sectional side view of a deep welding technique in accordance with the present invention.

Referring now to the prior art drawing of FIG. 3 versus FIG. 4, some distinctions of the novel process of the present invention over the prior art will now be emphasized. The stream welding method of the present invention is particularly well suited for application in thick, deep weld joints. In the past, multiple pass welding was the common method for joining thick workpieces 112. To accomplish this, it was necessary to form a "V"-shaped groove 113 between the pieces to be joined so that the deeper portions of the weld were accessible, as shown in FIG. 3. The multi-pass weld process required a repetitive series of applications 114, beginning in the narrow and deep portions of the groove 113, and working upward. The technique is time-consuming, laborious, and inconsistent and includes the limitations associated with GMAW and spray welding described above.

Stream welding overcomes these limitations by allowing the two pieces 116 to be joined in a single application, as shown in FIG. 4. The faces to be joined are cut flat and parallel 115 in the weld area. A single application of a continuous molten metal stream 118 fills the seam in an efficient manner which is predictable and consistent.

This now completes a description of the preferred embodiment of the invention. Advantages of the present invention and alternative embodiments are hereinafter described.

Advantages of this new process include simplification of the control of the heat input to the workpiece, decoupling of the heat input from the mass flow rate, production of a fine stream of molten metal, and elimination of deficiencies of existing thermal spraying processes. Stream welding overcomes the limitations of prior art spray welding and spray forming processes. Stream welding results in a strong bond with good adhesion between the stream deposit and the workpiece. There is no need for post-weld treatment or curing processes, such as shot peening. The stream is released in a uniform flow at a controlled velocity and therefore, does not cool as quickly as droplets released at high velocities. The stream is consistently uniform, unlike the non-uniform droplets, reducing porosity problems. The stream is ejected at a known uniform energy state in thermal equilibrium, unlike the droplets which have varied, unknown energy states. The smoothly-flowing stream virtually eliminates the splatter problems common in spray techniques.

High temperature is obtained by energy efficient direct-arc heating of the small molten charge mass 14 with relatively low power input. With a small charge mass 14, this embodiment offers high-bandwidth temperature variance. The temperature and flow rate of the molten charge mass 14 are controlled independently. Low power consumption offers a cost advantage over prior art methods.

Experiments were performed to determine which of several factors are of primary importance when considering system efficiency. These factors include the initial charge mass, the thickness of the crucible, and the thickness of the insulation. For each experiment, two parameters were kept constant and the remaining parameter was increased and decreased by 50%. It was determined that the mass of the charge has the largest effect on the thermal bandwidth on the system. It was also determined that a smaller crucible increases both the bandwidth of the system and the attainable temperature. It was also determined that the size of the insulation is not as critical as the crucible thickness and the charge mass.

The experimental embodiment included an electrode comprising 2% thoriated tungsten and measured 7 inches in length and 0.125 inches in diameter. The power supply was a Hobart™ Cyber TIG III™ with a 100% duty cycle of 2.4 kWatts. The thermocouple was C-type and was shielded by a mullite tube on top of the molten metal bath.

Note that the term "metal" as used herein includes tin, aluminum, copper, alloys, steel and any other material which may be applied in the stream welding process described herein.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A system for generating a continuous flow of molten metal comprising:

a metal mass;

a crucible having an orifice for containing said metal mass;

an electrode mounted adjacent said metal mass;

a power source for providing said electrode with current, said current forming an arc between said electrode and said metal mass, said arc heating said metal mass to a molten metal mass;

a pressurized gas source for providing gas under pressure to propel said molten metal mass through said orifice;

a metal feeder for providing metal at a rate to replenish said molten metal mass as the volume of said molten metal mass is diminished when said molten metal mass is propelled through said orifice; and a control system for controlling said electrode current, said gas pressure, and said metal feeder rate to provide a continuous stream of molten metal mass out said orifice.

2. The system of claim 1 wherein said stream is output from said orifice at a rate and a temperature which are decoupled.

3. The system of claim 1 wherein said stream is output from said orifice at a temperature and wherein the system further comprises a heat sensor for sensing the temperature of said stream, said control system controlling said electrode current in response to said temperature.

4. The system of claim 3 wherein said heat sensor comprises a thermocouple.

5. The system of claim 3 wherein said heat sensor comprises a pyrometer.

6. The system of claim 1 further comprising a pressure regulator for regulating said gas pressure and wherein said stream is output from said orifice at a rate which is controlled by said regulated gas pressure.

7. The system of claim 1 further comprising a voltage sensor for sensing the voltage across said arc, said control system controlling said metal feeder rate in response to said voltage.

8. The system of claim 1 further comprising:

a workpiece for receiving said stream of molten metal; and a temperature sensor for sensing the temperature of said workpiece, said control system controlling said current in response to said temperature.

9. The system of claim 1 wherein said crucible comprises graphite.

10. The system of claim 1 further comprising a radiation shield proximal to said crucible.

11. The system of claim 1 further comprising a shielding gas source for bathing said molten metal to prevent reaction with atmospheric gases.

12. The system of claim 1 further comprising insulation for retaining heat energy in the crucible.

13. The system of claim 12 wherein the insulation comprises aluminum oxide.

14. The system of claim 1 wherein said pressurized gas source comprises inert gas.

15. The system of claim 1 wherein said control system comprises a computer.

16. The system of claim 1 wherein said metal mass comprises a material selected from the group consisting of tin, aluminum, copper, steel and alloys.

17. A method for generating a continuous flow of molten metal comprising:

containing a metal mass in a crucible;

inducing current in an electrode proximal to said metal mass, forming an arc therebetween for heating said metal mass to a molten metal mass;

propelling said molten metal mass through an orifice in said crucible with gas pressure;

replenishing said molten metal mass with additional metal from a metal feeder; and controlling said current, said gas pressure and said metal feeder to provide a continuous stream of molten metal at said crucible orifice.

18. The method of claim 17 wherein the step of controlling further comprises providing said stream at a rate and a temperature which are decoupled.

19. The method of claim 17 wherein the step of controlling further comprises the steps of measuring temperature of said molten metal mass and controlling said current in response to said temperature.

20. The method of claim 17 wherein said stream is provided at a rate and wherein the step of controlling said gas pressure independently controls the stream rate.

21. The method of claim 17 wherein the step of controlling said metal feeder further comprises the steps of measuring the voltage across said arc and controlling said metal feeder in response to said voltage.

22. The method of claim 17 further comprising the step of bathing said stream in inert gas for limiting reaction between said stream and atmospheric gases.

23. The method of claim 17 wherein the step of controlling further comprises the steps of measuring a temperature of a workpiece receiving said stream and controlling said current in response to said temperature.

24. The system of claim 1, further comprising a workpiece for receiving said stream, said workpiece being welded by said stream.

25. A method for stream welding comprising:

containing a metal mass in a crucible;

inducing current in an electrode proximal to said metal mass, forming an arc therebetween for heating said metal mass to a molten metal mass;

propelling said molten metal mass through an orifice in said crucible with gas pressure;

replenishing said molten metal mass with additional metal from a metal feeder;

controlling said current, said gas pressure and said metal feeder to provide a continuous stream of molten metal at said crucible orifice; and depositing said stream on a weld workpiece.

26. The method of claim 25 wherein the step of controlling further comprises providing said stream at a rate and a temperature which are decoupled.

27. The method of claim 25 wherein the step of controlling further comprises the steps of measuring a temperature of said molten metal mass and controlling said current in response to said temperature.

28. The method of claim 25 wherein said stream is provided at a rate and wherein the step of controlling said gas pressure independently controls the stream rate.

29. The method of claim 25 wherein the step of controlling said metal feeder further comprises the steps of measuring the voltage across said arc and controlling said metal feeder in response to said voltage.

30. The method of claim 25 further comprising the step of bathing said stream in inert gas for limiting reaction between said stream and atmospheric gases.

31. The method of claim 25 wherein the step of controlling further comprises the steps of measuring a temperature of said workpiece receiving said stream and controlling said current in response to said temperature.

32. The method of claim 25 wherein the step of depositing said stream provides filler metal for reinforcement strength and heat for creating a metallurgical bond on the workpiece.

* * * * *